Patented Feb. 22, 1927.

1,618,875

UNITED STATES PATENT OFFICE.

NELSON R. HAAS, OF DAYTON, OHIO, ASSIGNOR TO THE DAYTON ENGINEERING LABORATORIES COMPANY, OF DAYTON, OHIO, A CORPORATION OF OHIO.

MOLDED COMPOSITION AND METHOD OF MAKING THE SAME.

No Drawing.   Application filed April 14, 1925. Serial No. 23,143.

This invention relates to the manufacture of articles by molding dry mixtures of certain ingredients under heat and pressure, and particularly to the manufacture of articles suitable for electrical insulation, bearings, and the like.

One object of my invention is to produce such articles at relatively low cost by molding ingredients which are relatively inexpensive. The object is accomplished by mixing with finely divided woody material, such as powdered wood pulp, and a substance which is capable of being thoroughly mixed with the wood powder in a dry state and of functioning as a binder when the mixture is molded in a dry state under heat and pressure. I have discovered that dry, powdered silicic-acid makes a good binder in a dry molding process.

I am aware of the use of other compounds of silicon, such as sodium silicate, as binders for wood powder, but in molding processes using sodium silicate, the mixture is molded in a wet or plastic state. In the manufacture of electrical insulating parts, bearings and the like, the molding of dry mixtures can be carried on with greater rapidity, ease and uniformity than the molding of a wet or plastic mixture. Therefore the present invention possesses the advantages of dry molding known to molders of mixtures of wood powder and phenolic condensation products and the additional advantage of relatively low cost due to the use of a cheap binder.

The silicic acid is formed by a combination of commercial hydrochloric acid and sodium silicate. The result of this combination is silicic acid, a jelly-like substance which absorbs all water of crystallization, and exists in the presence of sodium chloride. The chemical reaction is $$_4HCl + Na_4SiO_4 = {_4}NaCl + H_4SiO_4.$$

The reaction product is dried, pulverized and mixed with wood pulp powder. For insulating materials not under heavy mechanical stresses a dry mixture of 10% wood pulp powder and 90% silicic acid has been found satisfactory. The temperature employed in the molding press is about 300° F. and the pressure 3000 lbs. per square inch. For the purpose of making bearing materials the proportions are approximately 25% wood pulp powder and 75% silicic acid. The molding temperature is about 300° F. and pressure 3000 lbs. per square inch. It has been found that such a bearing will absorb lubricating oil to the extent of 110% of the weight of the bearing.

The silicic acid as a binder has been found to possess excellent wear resisting qualities, and is practically non-hygroscopic. Therefore products made from these substances have proved very durable, and retain their shape on being exposed to moisture.

While the form of embodiment of the present invention as herein disclosed, constitutes a preferred form, it is to be understood that other forms might be adopted, all coming within the scope of the claims which follow.

What is claimed is as follows:
1. A material including a dry mixture of finely divided wood and silicic acid molded under heat and pressure.
2. Material for insulating purposes including a mixture of approximately 10% of dry wood pulp powder and 90% of dry silicic acid molded under heat and pressure.
3. The method of making a molded material which comprises mixing in a dry state finely divided wood and silicic acid and molding under heat and pressure.
4. A molding substance including a dry mixture of finely divided wood and silicic acid.

In testimony whereof I hereto affix my signature.

NELSON R. HAAS.